United States Patent [19]

Webb

[11] Patent Number: 4,673,087

[45] Date of Patent: Jun. 16, 1987

[54] COLLAPSABLE, REUSABLE CONTAINER SYSTEM

[75] Inventor: Daniel D. Webb, Troy, Mich.

[73] Assignee: Peninsula Plastics Co., Inc., Auburn Hills, Mich.

[21] Appl. No.: 794,898

[22] Filed: Nov. 4, 1985

[51] Int. Cl.⁴ .................. B32B 27/00; B65D 19/18; B65D 6/22; B65D 21/06

[52] U.S. Cl. .................. 206/600; 206/503; 206/508; 206/511; 206/517; 16/225; 16/383; 220/4 F; 220/76

[58] Field of Search .............. 206/600, 503, 508, 511, 206/517; 16/225, 382, 383, DIG. 13; 220/4 F, 76, 469

[56] References Cited

U.S. PATENT DOCUMENTS

| | | | |
|---|---|---|---|
| 2,525,838 | 10/1950 | Smith et al. | 206/511 |
| 3,266,656 | 8/1966 | Kridle | 220/4 F |
| 3,374,915 | 3/1968 | Verhein et al. | 206/511 |
| 3,968,895 | 2/1976 | Barnes, Jr. et al. | 206/600 |
| 4,002,261 | 1/1977 | Litchfield | 220/4 F |
| 4,287,997 | 9/1981 | Rolfe et al. | 206/511 |
| 4,320,845 | 3/1982 | Waller | 206/511 |
| 4,456,142 | 6/1984 | Burling | 206/508 |
| 4,480,748 | 11/1984 | Wind | 206/600 |
| 4,561,554 | 12/1985 | Swincicki | 206/508 |
| 4,563,381 | 1/1986 | Woodland | 16/225 |

FOREIGN PATENT DOCUMENTS

| | | | |
|---|---|---|---|
| 1298440 | 6/1969 | Fed. Rep. of Germany | 220/4 F |
| 1559983 | 12/1969 | Fed. Rep. of Germany | 16/382 |
| 1109845 | 4/1968 | United Kingdom | 16/225 |
| 1548945 | 7/1979 | United Kingdom | 16/225 |

Primary Examiner—William Price
Assistant Examiner—Brenda J. Ehrhardt
Attorney, Agent, or Firm—Cullen, Sloman, Cantor, Grauer, Scott and Rutherford

[57] ABSTRACT

A container is formed of a rigid, flat base, a rigid cover, and four vertically arranged, flat wall forming panels that are connected together along their adjacent vertical edges by hinge-like corner connectors and whose upper and lower edges are removably held in corresponding grooves formed in the base and cover. The panels are made of plastic extruded into parallel, spaced apart rigid sheets that are interconnected by numerous, spaced apart, transverse strips whose opposite ends are integral with the sheets. Each corner has a flat, sheet-like base strip that is integrally formed with a flexible center and rigid opposite edge sections that extend along the length of the connector base. Each of the opposite edge sections has an integral T-shaped rib extending along its length. The ribs are inserted endwise into elongated vertical slots formed in the endmost strips of the adjacent panel edges for fastening the connectors to the panels. Additional hinge joints may be formed on the vertical center lines of two opposed panels so that these panels may be folded together for folding the wall panels flat for positioning within the base and encapsulated by the cover for non-use, storage and shipping.

7 Claims, 7 Drawing Figures

The cover also has corner sockets 27 to receive the lower leg portions 19 of the base of another container, for stacking containers. The sockets are formed of raised, molded welts 28 having gaps 29 for receiving the rods 21 that extend between the legs.

The four side wall panels are preferably formed of polycarbonate plastic material. Such material is fire resistant and generally inert to weathering, etc. These panels comprise a pair of relatively thin, spaced apart, parallel sheets 30 which are interconnected by integral transverse strips 31. The endmost strips 32 on each panel form the vertical edges of the panels. These are provided with slots 33 to form grooves.

The strips 31 and the sheets 30 are extruded at one time to produce a hollow panel construction with integral, thin, vertical columns, formed of the strips. That construction provides considerable strength and durability, yet is relatively lightweight.

The corner connectors 35 (see FIG. 5) are made with a flat base strip 36 that is longitudinally divided into three sections. The center section 37 is flexible or resilient and preferably is made of an elastomeric plastic material selected from among the commercially available groups that have the durability, strength and flexibility for this intended purpose. The two outer edge sections 38 are preferably made of a rigid plastic material to provide rigidity for reinforcing the container construction. The corner connectors are extruded with the two different kinds of plastic materials to provide an integral or one-piece construction.

T-shaped ribs 40 are formed integral with the outer edge sections 38 of the connectors. These ribs extend longitudinally along the full length of the connectors. Flanges 41 and 42 formed integral with the opposite edges of the outer edge sections 38 provide a pair of channels 43 on each connector. The pairs of flanges may be perpendicular to the flat base 36, or may be angled slightly towards each other so that the channels may be slightly narrower at their mouths than their bases.

As illustrated in FIG. 4, each connector is engaged with the adjacent edge portions of a pair of the panels. The engagement is accomplished by sliding the connectors endwise relative to the panel edges so that the T-shaped ribs 40 slide into and through the slots 33 in the panel end strips 32. Once the panels and the connectors are assembled manually, adjacent panel edges may be bent at right angles, as illustrated in FIG. 4, to form the corners of the open or set-up walls. Where the connectors are used to interconnect the two halves of the split walls 12, the connectors are bent to the point where the two adjacent wall halves are in the same plane.

The rigidity of the container corners is assisted by the rigid U-shaped configurations provided by the connector and also by the relatively snug contact and engagement between the head of the T-shaped ribs and the interior surface of the end strips of the panels.

In operation, the walls and connectors are joined together as shown, for example, in FIG. 7. Then the walls are moved to form the corners, as shown in FIG. 4. The lower edges of the container walls are inserted into the grooves 17 in the base to form the open container. After loading the container, the cover is applied with the cover channels 26 receiving the upper edges of the container walls.

For disassembly or knock-down of the container, one of the corner connectors can be slid upwardly, relative to the panels, for removal so that the panels can be folded flat relative to each other. Alternatively, if the split walls are used, these are folded about their central hinge means. In that case, as illustrated by the dotted line in FIG. 1, the walls can be collapsed in flat position.

The flattened walls are placed within the base and the cover is used to form a closed package that can be stored or shipped easily. At the same time the parts are protected against damage. Although other types of wall panels can be used with the connector 35, the particular panel construction disclosed is preferable where high strength and light weight and relatively large size are required.

Having fully described an operative embodiment of this invention, I now claim:

1. A collapsable, reusable container comprising:
 a flat, rigid base and four, normally vertically arranged, wall forming panels which are connected together along their adjacent vertical edges by hinge-like corner connectors, and whose lower edges rest upon the base;
 said corner connectors being formed of an initially flat, sheet-like base made of a single plastic extrusion which is longitudinally divided into an integral flexible center section stripe and opposite side edge, rigid, section stripes said connectors including roughly parallel flanges integrally formed on the connector base and extending outwardly from the same side of the connector base at each longitudinal edge of each of the rigid edge sections so that each rigid edge section forms the base, and its flanges form the legs, of a U-shaped channel, and the channels snugly receive the portions defining the vertical edges of the panels;
 each of said corner connectors being bendable from a first position wherein said flanges and attached panels are substantially parallel to one another and said sheet-like base is substantially flat to a second position wherein said flanges and attached panels are perpendicular to one another and said center section stripe is bent at approximately a right angle whereby the panels may be folded about the connector flexible center sections into a generally flat relationship for storage and handling.

2. A container as defined in claim 1, and including a longitudinally extending rib intregally formed on each of the edge sections and extending into a correspondingly formed groove in the adjacent panel edge for securing the connectors to the panel.

3. A container as defined in claim 2, and each of said panels being made of a plastic extrusion formed into the shape of two parallel, spaced apart rigid sheets that are joined together by vertically arranged, parallel, spaced apart strips that extend transversely of the sheets, with the opposite ends of the strips integral with the sheets;
 and the endmost strip of the opposite vertical edges of each panel forming the respective panel edge and being provided with a vertical elongated slot forming the groove for receipt of the corner connector ribs.

4. A connector as defined in claim 2, and said ribs each being generally T-shaped in cross section with the stem of the T fitted through the respective slot in the adjacent panel edge strip and the head of the T engaging the inner, i.e., the concealed, surface of the panel edge strip while the outer, i.e., exposed, surface of the panel edge strip engages the adjacent surface of the connector side edge section.

COLLAPSABLE, REUSABLE CONTAINER SYSTEM

BACKGROUND OF INVENTION

Relatively large, heavy duty shipping containers are commonly reused by returning the empty container after removal of the items shipped within the container. However, since empty or full shipping containers occupy the same volume, returning an empty container requires just as much shipping space as the container required in the first instance. Since the expenses for shipping or storage may be determined by volume, reusing empty containers is relatively expensive. Frequently, it is not economically feasible to reuse empty containers because of the shipping expense.

Thus, various systems have been used to reduce the cost of shipping and storing empty containers in a knock-down condition. But, such systems ordinarily require considerable labor and frequently, require relatively expensive container construction. Thus, there has been a need for shipping containers which can be stored or shipped in knock-down condition, which can be disassembled and reassembled swiftly, without any substantial manual effort or labor or tools, and which are of sufficiently heavy duty construction to satisfy the initial shipping requirements. The invention herein relates to a simple, strong shipping container system which may be made of durable plastics and can be easily set up or knocked down without tools.

SUMMARY OF INVENTION

The invention herein contemplates forming a shipping container with a rigid, tray-like base, four rigid walls whose adjacent edges are interconnected by hinge-like connectors, and rigid cover. The walls may be formed of extruded plastic panels made of two parallel sheets that are interconnected by integral transverse strips to provide rigidity and strength. The corner connectors also are formed of an extruded plastic strip, but with a longitudinal center section made of a flexible or resilient plastic material and integral, longitudinal, opposite side sections formed of a rigid plastic material. The rigid side sections are connected to the panel edges and the connectors can be easily bent about their flexible center sections, to provide the rigidity, strength, and flexibility needed. The lower and upper edges of the panels can be easily inserted within channels formed in the base and cover to set up the container shape. Alternatively, the panels can be disassembled without special tools and with little manual effort.

When not in use, the walls or panels can be folded flat and placed into the base. Then the same cover may be used as a closure for the knock-down parcel formed of the folded walls and the base of the container.

This invention contemplates forming the corner connector out of a single extrusion which is made of two separate materials. The first is a resilient or flexible material which forms the hinge-like center section of the corner connector. The second is a rigid material which forms rigid channels and ribs for interlocking to the edges of the panels. The corner extrusion, has integral T-shaped ribs which slide endwise into and interlock within slots formed on the edge strips of each of the panels, so that the connector can be manually applied to or removed from the panels without special tools.

Two opposed walls of the container each may be vertically split in half at their center lines and interconnected by an additional hinge means. The same corner connectors may be used to form such additional hinge means. This hinging permits double folding those walls inwardly so that the corner connectors need not be removed when folding all the walls into flat position.

The corner connectors herein can be used to connect together panels which may be used for other purposes, such as for partitions, flexible or roll-up types of covers and the like. Thus, although primarily intended for container purposes, the corner connectors of this invention may have other similar uses because of their simple and effective construction.

These and other objects and advantages of this invention will become apparent upon reading the following description, of which the attached drawings form a part.

DETAILED DESCRIPTION

Figure 1:
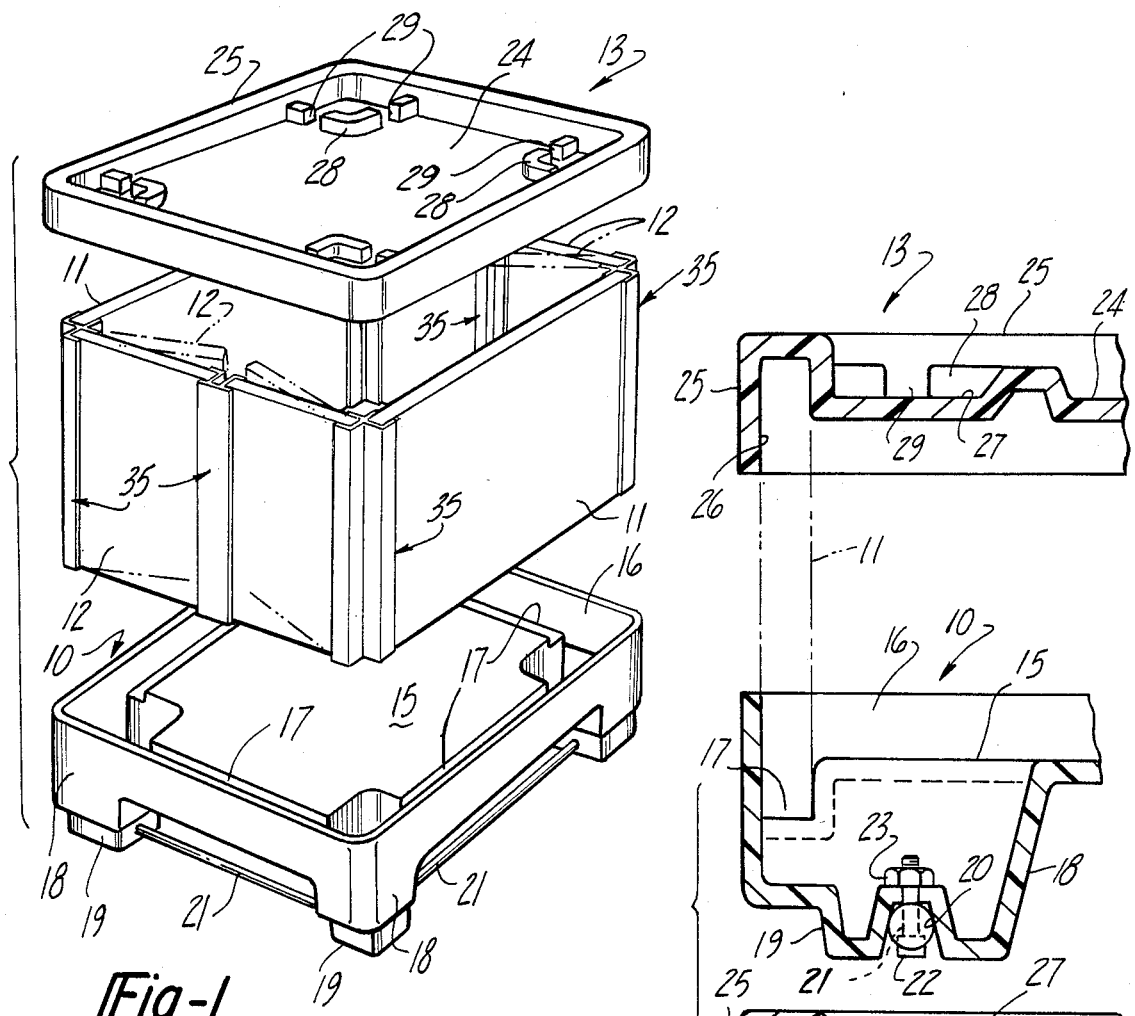
FIG. 1 is a perspective view of the container, with the cover, walls and base separated.
Figure 2:
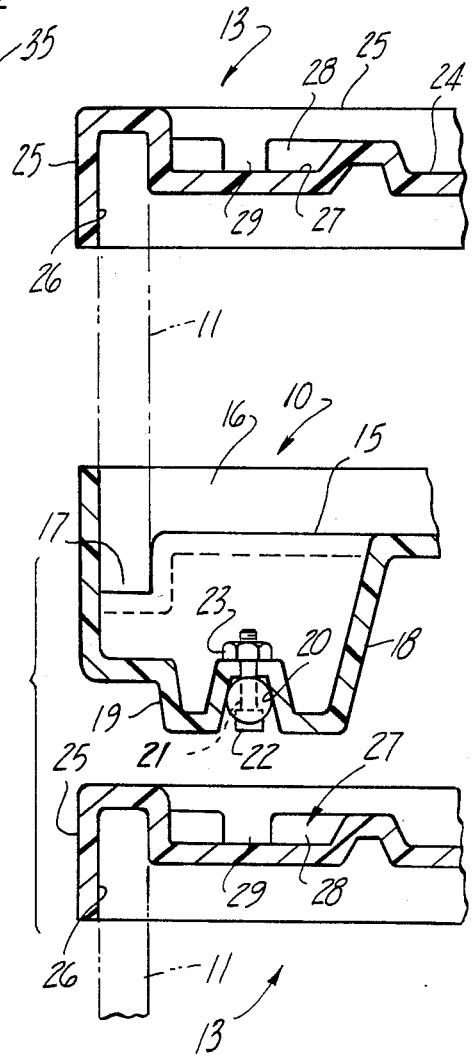
FIG. 2 is an enlarged, cross sectional, fragmentary view of a corner of the container and base, located above the corner of another container cover to show how the legs of the base and a cover may be engaged for stacking containers.
Figure 3:
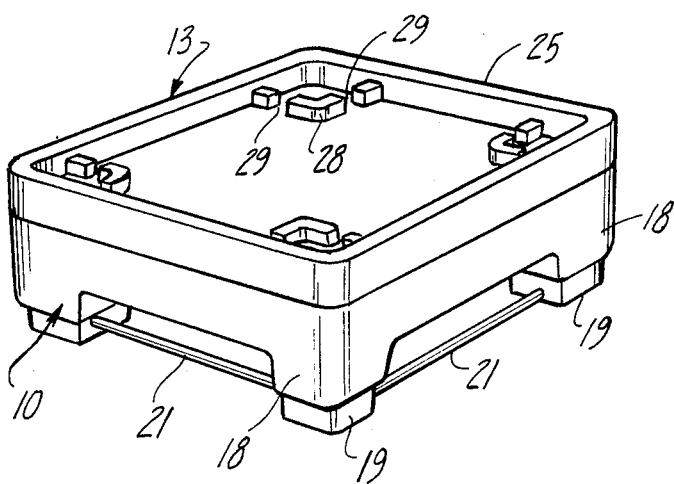
FIG. 3 is a perspective view of the container in knock-down condition with the folded walls encapsulated within the base and cover.
Figure 4:
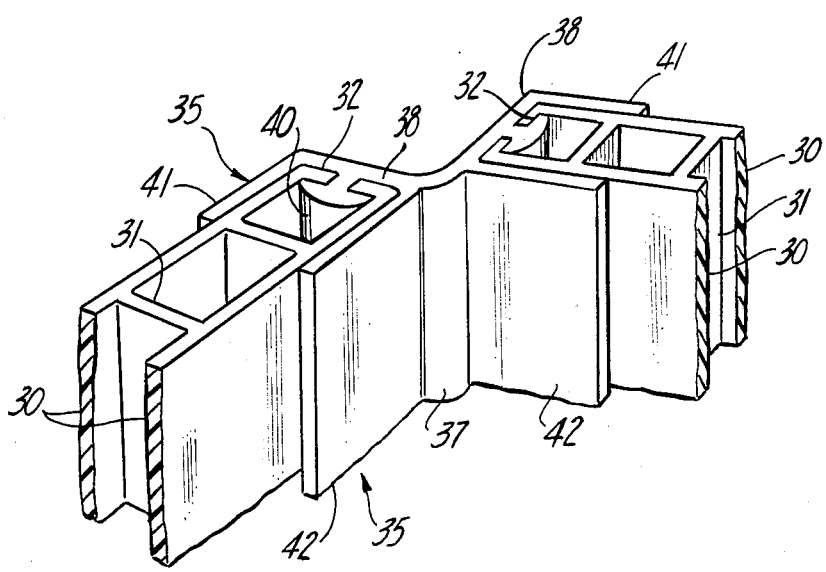
FIG. 4 is a perspective, fragmentary view of a corner connection formed by the connector and adjacent panel edges.
Figure 5:
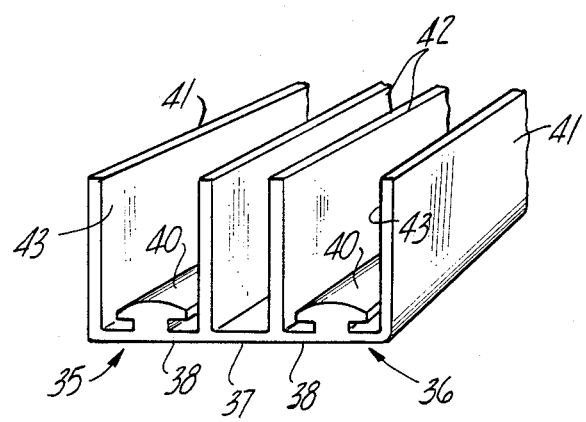
FIG. 5 is an enlarged, perspective view of a corner connector.
Figure 6:
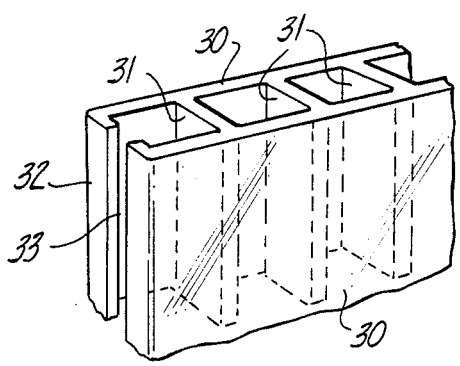
FIG. 6 is an enlarged, fragmentary, perspective view of a corner of one of the wall forming panels.
Figure 7:
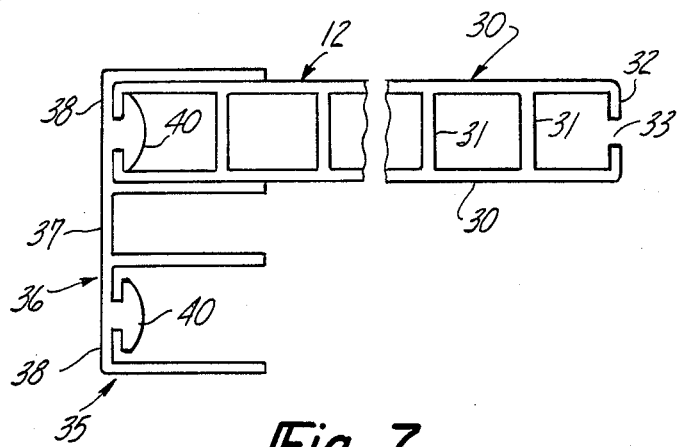
FIG. 7 is an enlarged, fragmentary, plan view of one of the walls connected to the corner connector.

Referring to FIGS. 1 and 2, the container is formed with a tray-like base 10, two full side walls 11, two split side walls 12 and a cover 13. It is contemplated that all of the parts will be made of suitable, commercially available plastic materials which are either extruded or mold formed.

The base 10 may be vacuum formed out of a flat sheet of plastic into a tray-like shape with a bottom panel 15 surrounded by low walls 16. A groove 17 is formed in the bottom panel adjacent the low walls to receive the bottom edges of the container walls. Legs 18 are formed at each of the corners of the base. The lower portions 19 of the legs are reduced in size relative to the upper leg portions and have molded channels 20 which open downwardly. Stiff wire-like rods 21 extend between the legs and are fastened within the channels 20 by bolts 22 extending through holes in the rods and the channel base for engagement with nuts 23 (see FIG. 2). These rods assist in supporting the base upon lift trucks and the like and in interengaging stacked containers, as well as to reinforce the base.

The cover 13 may be vacuum formed in the same way as the base to provide a flat panel 24 which is surrounded by a low wall 25 which is double bent to form a downwardly opening channel 26. This channel receives the upper edges of the container wall panels.

5. A container as defined in claim 4, and with two opposite panels each having an additional, vertically aligned, horizontally foldable hinge means formed at its middle, so that such panels may be folded inwardly towards each other for further flattening the assembly of the four panels.

6. A container as defined in claim 1, and said base having a generally flat bottom panel surrounded by a low wall, with grooves in the bottom panel adjacent the low wall for receiving the lower edges of the wall forming panels;

a container cover having a flat cover panel surrounded by a low wall which has channels formed therein for receiving the upper edges of the wall forming panels;

and wherein the folded wall panels may be positioned within the base and covered by the container cover for storage and shipping.

7. A container as defined in claim 6, and said base having depending support legs, with horizontally arranged rods interconnecting said legs;

and leg receiving sockets, with openings, formed in the container cover for receiving the legs and the rods of the base of another container for stacking containers.

* * * * *